Dec. 29, 1953      C. H. NELSON      2,664,070
STOCK WATERER
Filed Nov. 6, 1950

Carroll H. Nelson INVENTOR.

BY Bush & Bush
Attorneys.

Patented Dec. 29, 1953

2,664,070

UNITED STATES PATENT OFFICE 2,664,070

STOCK WATERER

Carroll H. Nelson, Cedar Rapids, Iowa

Application November 6, 1950, Serial No. 194,233

11 Claims. (Cl. 119—81)

My invention relates to watering basins for stock, including cattle, hogs and other farm animals and may be used for poultry.

The objects of my invention are to provide a simple, economical form of watering basin or bowl having automatic means to insure refilling; to provide means to effectively prevent dirt, trash or other foreign matter from entering the water intake and the reservoir; to provide means to readily cleanse the bowls and to secure the bowls against displacement by the animals. Other objects will appear from the specification.

I accomplish these objects by the means illustrated in the accompanying drawings, in which, Figure 1 is a plan view with parts broken away;

Similar numerals refer to similar parts throughout the several views.

Figure 1:
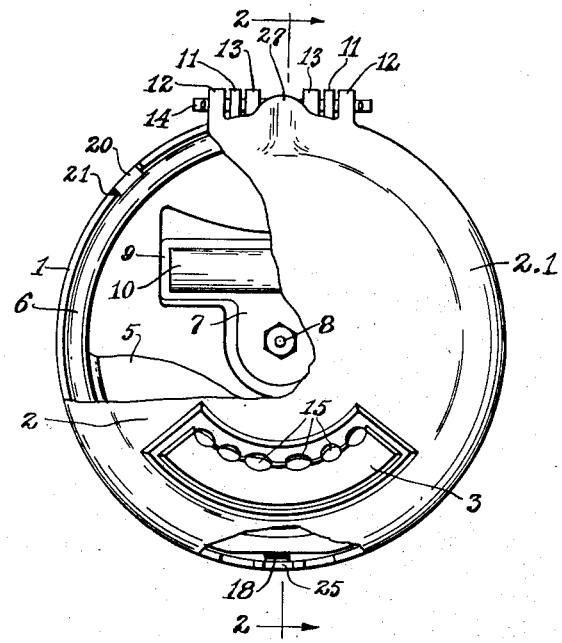

My invention comprises a housing 1 preferably cylindrical and of any suitable size for the use intended. For hogs, a height of about one foot and a diameter of about 13 inches will be found satisfactory for single units.

The housing may be mounted upon any substantial form of base and bolted thereto to secure it against displacement.

In the upper part of the housing 1 a bowl-shaped reservoir 6 is mounted with a plurality of lugs 20 formed thereon arranged to seat in notches 21 in the upper edge of the housing.

The lower part of the reservoir has a chamber 9 formed integral therewith to contain an electric heating element 10 and valve 8 which is mounted in the bottom of the reservoir 6 in an extension 7 of the chamber 9.

A float bowl 5 is mounted in the reservoir 6 and arranged to float when the water stands at a predetermined level in the cover bowl and to sink when the cover bowl 2 is filled with water. When the float bowl 5 is down, it rests upon the stem of the valve 8 and closes it, but when the bowl 5 floats, it rises above the valve stem and allows the valve 8 to open and the water to flow into the reservoir from the water supply pipe 22.

The supply pipe 22 is in the form of a flexible hose and may have its lower end connected in any suitable manner with the supply pipe 24 led in through the base.

Within the float bowl 5, a cover bowl 2 is mounted, the rim 2.1 or upper edge of which is rounded and curved downwardly to rest upon the upper edge of the housing 1.

At one side of the rim 2.1 of the cover bowl, hinge members 12—12 are formed integral with the rim and secured upon a hinge bolt or pin 14 which is journaled in the upper end of a pair of spaced flanges 11—11 formed integral with the housing 1. Additional hinge members 13—13 are united to the reservoir 6 and turn upon the pin 14.

The float bowl 5 is held in place between the cover bowl and the reservoir and is freely removable when the cover bowl is raised upon its hinge.

The arrangement of the hinges allows the cover bowl, float bowl and reservoir to be raised simultaneously or separately as desired.

In order to secure the cover bowl against accidental displacement, a latch is formed of a flat spring plate 18 mounted on the inside of the housing at the upper edge thereof which is provided with an opening therein of sufficient size to receive a small knob or projection 17 rigidly united to the rim of the cover bowl on the inside thereof.

The housing is provided with an opening 25 adjacent the spring plate 18 to permit pressure of a finger or thumb against the spring 18 in order to release the catch and permit the cover bowl to be raised upon the hinges 12.

In order to prevent dirt, trash or other foreign substances which may accumulate in the cover bowl 2 from passing into the reservoir 6 or heating chamber 9 or into the valve 8 or water supply pipe 22, the float bowl 5 is made water tight and the only access of water into it is over the top edge thereof which is normally positioned at or a little below the top of the water level of the water reservoir 6 or through openings 28 in the wall of the float bowl 5 near the top thereof. An opening 16 in the chamber or conduit wall 4 at the upper part of the chamber 26 allows water to pass from the float bowl into the chamber 26 close to the top of the chamber from whence it will flow downwardly by direct action of gravity or by siphoning downwardly through the chamber or conduit to openings 15 provided in the inner wall 3 of the chamber or conduit 26 at or near the bottom thereof and thence into the cover bowl 2. When the water rises in the reservoir to the top of the float bowl 5 or to the openings 28 therein, it will run into the float bowl and thence run or be siphoned into the chamber or conduit 26 of the cover bowl through the opening 16 in the outer wall of the cover bowl or conduit.

Figure 2:
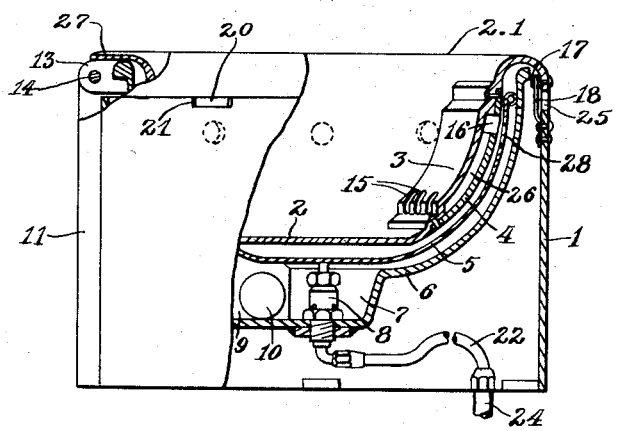
Figure 2 is a fractional elevation partly in section on the line 2—2 of Figure 1.
Figure 3:
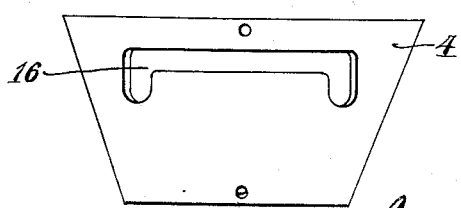
Figure 3 is an enlarged detail of the lateral cover plate for the chamber.

In Figure 2 of the drawings, the wall 3 of the chamber 26 is shown integral with the cover bowl 2 and its rim 2.1. The wall 4 of that chamber is shown as separate but secured to the wall 3 and bowl 2 by small rivets or bolts which are not numbered in the drawings. The wall 4 may be fastened by bolts, set screws, rivets or any other suitable fastening.

From the chamber 26 the water passes into the middle of the cover bowl through openings 15 formed in the inner wall 3 of the chamber.

In the operation of my waterer, the heater is connected by a flexible insulated electric conduit with a source of electric current and a water valve is connected to a flexible water supply pipe or hose 22 of sufficient length to permit raising the cover bowl to empty the contents thereof which can be poured over a small nose or spout 27 formed integral with the rim 21 in order to carry the water away from the housing.

Such heaters and valves are already in use and no claim is made to any particular heater or water supply.

When the waterer is assembled empty, the float bowl may be raised manually so as to allow the valve 8 to open and the water to flow into the reservoir until it reaches the openings 28 near the top of the float bowl, when it will flow over into the float bowl and fill it. When the water in the float bowl reaches the height of the opening 16 in the cover plate 4, it will flow into the chamber 26 and thence through the openings 15 into the cover bowl.

As the cover bowl fills with water, the weight of the water being transmitted by gravity to the float bowl, will cause it to descend and shut off the valve 8 so that no more water will be admitted until the level of the water has been reduced by the animals drinking out of the cover bowl. When thus reduced, the weight of the water resting upon the float bowl is reduced and permits the float bowl to rise by reason of its buoyancy and thus reopen the valve 8.

In order to insure the proper operation of the float bowl, the opening 16 is in the form of a long horizontal slot to admit water rapidly from the float bowl into the pocket 26 but at the end of the slot the opening is extended downwardly so that as the water is withdrawn by the animals drinking it, it will lower the level of the water in the float bowl sufficiently to cause it to float.

In waterers for hogs and some other animals, it is common for dirt and other foreign matter from the snouts of the animals to fall into the cover bowl and provision must be made to prevent contamination of the water in the supply pipe therefrom.

It will be noticed that in a waterer as described and illustrated, the cover bowl and reservoir may be raised upon the hinge into vertical position and when so raised, the water will flow out over the spout and carry with it any dirt, trash or other foreign matter that has accumulated in the cover bowl and that the arrangement of the chamber or pocket in the side wall of the cover bowl and the openings thereinto are such as to prevent any return flow of water from the cover bowl into the float bowl or into the reservoir. So it is impossible for the water in the supply pipe to become contaminated even if the pressure of water in the supply pipe should fail or the supply pipe be drained, for the water and dirt in the bottom of the cover bowl cannot flow uphill to reach the openings at the top of the cover of the pocket or chamber and there is no other way for it to reach the float bowl or the reservoir.

The pressure of water in the supply pipe may vary in accordance with the height of the water in a water tank from which it is taken or with the pressure maintained by the pumps in a water supply system operated by pumps. Experience has shown that when there is a relatively high pressure of water in the supply pipe, the water level in the reservoir will rise to a somewhat higher point than when there is a lower pressure in the supply pipe.

It also appears that the upward pressure of the water in the supply pipe against the lower end of the valve may be transmitted to the float bowl and coact with the buoyancy to help raise the bowl and open the valve.

In order to insure the float bowl rising when the water has been reduced in the cover bowl by the animal's drinking from it, it is necessary to have the openings 16 in the cover plate 4 extend low enough so that the water in the float bowl itself will be lowered sufficiently to allow the water in the reservoir to raise the float bowl and the position and size of the openings 16 may be varied as necessary to meet the requirements of various cases. Likewise, openings 28 may be provided in the float bowl somewhat below the top thereof instead of requiring the water to flow over the top of the float bowl to get into it from the reservoir.

In the claims I refer to the upper bowl as the "cover bowl" or "top bowl" and to the float bowl as the "float bowl" or "intermediate bowl" and to the reservoir as the "reservoir" or "lower bowl."

The size, proportion and arrangement of the various parts and the size and location of the openings may be varied to suit the requirements of different kinds and numbers of animals.

Various modifications may be made in the size, form and proportions of the parts without departing from the spirit of my invention as expressed in the claims and I do not limit my claims to the precise forms shown in the drawings.

I claim:

1. In a stock waterer, a housing, a reservoir mounted in the upper part thereof, an intermediate float bowl seated loosely in the reservoir, a cover bowl having its side wall and bottom extending downwardly into the intermediate bowl and having a rim rounded and extending outwardly and downwardly to rest upon the upper edge of the housing, the intermediate bowl being provided with openings in the wall thereof near the top to permit water to enter that bowl when it reaches a predetermined level in the reservoir, the cover bowl side wall being provided with a chamber having its inner wall integral with the cover bowl and its outer wall spaced from its inner wall and rigidly united thereto, the outer wall of the chamber being provided with openings near the top thereof and the inner wall of the chamber being provided with openings near the bottom thereof whereby water may pass from the float bowl into and through the chamber and into the lower central portion of the cover bowl, a water supply pipe in the housing leading to a valve mounted in the bottom of the reservoir adapted to supply water thereto, said valve being provided with an upwardly projecting stem adapted to be contacted by the bottom of the float bowl when the float bowl is in its lowermost position and thereby to open the valve, said valve also being adapted to be closed by the pressure of the water in the supply pipe when the float bowl rises sufficiently to clear the valve stem.

2. A stock waterer as described in claim 1, the cover bowl and reservoir being hinged to the upper edge of the housing.

3. A stock waterer as described in claim 1, the cover bowl and reservoir being hinged upon a single hinge pin or pivot to the upper edge of the housing whereby they may be raised into vertical position either separately or in unison.

4. A stock waterer as described in claim 1, and a spring-held latch or catch mounted upon the housing arranged to secure the cover bowl in place upon the housing.

5. In a stock waterer having a housing, a reservoir, a float bowl mounted in the reservoir and a cover bowl extending into the float bowl, the cover bowl being provided with a lateral chamber, the upper part of the float bowl being provided with an opening in the side wall thereof at the desired water level, and the outer wall of the lateral chamber in the cover bowl being provided with upper openings substantially higher than the bottom of the cover bowl and its inner wall being provided with lower openings near the level of the bottom of the cover bowl which arrangement will prevent water from flowing from the cover bowl back into the float bowl, a water supply pipe in the housing leading to a valve mounted in the bottom of the reservoir adapted to supply water thereto, said valve being adapted to be closed by the pressure of the water in the supply pipe when the float bowl rises sufficiently to clear the valve stem.

6. In a stock waterer as described in claim 5, the upper opening in the outer wall of the lateral chamber being approximately at the desired maximum water level and the lower openings in the inner wall thereof being close to the bottom of the cover bowl.

7. In a stock waterer, a cylindrical housing, a circular reservoir mounted in the upper part of the housing, a float bowl seated loosely in the reservoir, a circular cover bowl extending down into the float bowl and having its rim rounded and extending downwardly to rest upon the upper edge of the housing, the side wall of the cover bowl being provided with a chamber having openings in the inner wall of the chamber near the bottom thereof whereby water may pass by gravity from the float bowl through the chamber and into the lower portion of the cover bowl but cannot pass in the opposite direction by gravitation while the apparatus is in normal position for use, and an opening in the outer wall of the chamber near the top thereof, a water supply pipe in the housing leading to a valve mounted in the bottom of the reservoir adapted to supply water thereto, said valve being provided with an upwardly projecting stem adapted to be contacted by the bottom of the float bowl when in its lowermost position and thereby to open the valve, said valve also being adapted to be closed by the pressure of the water in the supply pipe when the float bowl rises sufficiently to clear the valve stem.

8. In a stock waterer, a housing, a reservoir mounted in the upper part thereof, an intermediate float bowl seated loosely in the reservoir, a cover bowl having its side wall and bottom extending downwardly into the intermediate bowl, the intermediate bowl being provided with an opening in the wall thereof near the top to permit water to enter that bowl when it reaches a predetermined level in the reservoir, the cover bowl side wall being provided with a chamber having one of its walls integral with the cover bowl and its other wall spaced from its first mentioned wall and rigidly united thereto, the other wall of the chamber being provided with openings near the top thereof and the one wall of the chamber being provided with openings near the bottom thereof whereby water may pass from the float bowl into and through the chamber and into the lower central portion of the cover bowl, a water supply pipe in the housing leading to a valve mounted in the bottom of the reservoir adapted to supply water thereto, said valve being provided with an upwardly projecting stem adapted to contact the bottom of the float bowl when in its lowermost position and thereby to open the valve, said valve also being adapted to be automatically closed when the float bowl rises sufficiently to clear the valve stem.

9. In a stock waterer, the combination with a housing, of a reservoir mounted in the upper part thereof, an intermediate float bowl seated loosely in the reservoir, a cover bowl with a side wall and bottom extending into the intermediate bowl and having a rim rounded and extending outwardly and downwardly to rest upon the upper edge of the housing, the intermediate bowl being provided with an opening in the wall thereof near the top to permit water to enter that bowl when it reaches a predetermined level in the reservoir, the cover bowl side wall being provided with a chamber having its inner wall integral with the cover bowl and its outer wall spaced from its inner wall and rigidly united thereto, the outer wall of the chamber being provided with openings near the top thereof and the inner wall of the chamber being provided with openings near the bottom thereof whereby water may pass from the float bowl into and through the chamber and into the lower central portion of the cover bowl, a water supply pipe in the housing leading to a valve mounted in the bottom of the reservoir adapted to supply water thereto, said valve being provided with an upwardly projecting stem adapted to contact the bottom of the float bowl when said bowl is in its lowermost position and thereby to open the valve, said valve also being adapted to be closed by the pressure of the water in the supply pipe when the float bowl rises sufficiently to clear the valve stem.

10. A stock waterer including a housing, a reservoir mounted in the upper part thereof, an intermediate float bowl seated loosely in the reservoir, a cover bowl having a side wall and bottom extending downwardly into the intermediate bowl and having a rim rounded and extending outwardly and downwardly to contact the upper edge of the housing, the intermediate bowl being provided with openings in the side wall thereof near the top whereby water may enter that bowl when the water reaches a predetermined level in the reservoir, the cover bowl side wall being provided with a chamber having its inner wall integral with the cover bowl and its outer wall spaced from its inner wall and united thereto, the outer wall of the chamber being provided with openings near the top thereof and the inner wall of the chamber being provided with openings near the bottom thereof whereby water may pass from the float bowl through the chamber and into the lower central portion of the cover bowl, a water supply pipe in the housing leading to a valve mounted in the bottom of the reservoir adapted to supply water thereto, said valve being provided with an upwardly projecting stem adapted to be contacted by the bottom of the float bowl when the float bowl is in its lowermost position and thereby to open the valve, said valve also being adapted to be closed by the pressure of the water in the supply pipe when the float bowl rises sufficiently to clear the valve stem.

11. In a stock waterer including a housing, a reservoir mounted in the upper part thereof, an intermediate float bowl seated loosely in the reservoir, a cover bowl having a side wall and bottom extending downwardly into the intermediate bowl and having a rim rounded and extending outwardly and downwardly, the intermediate bowl being provided with openings in the side wall thereof near the top whereby water may enter that bowl when the water reaches a predetermined level in the reservoir, the cover bowl side wall being provided with a chamber having its inner wall integral with the cover bowl and its outer wall spaced from its inner wall and united thereto, the outer wall of the chamber being provided with openings near the top thereof and the inner wall of the chamber being provided with openings near the bottom thereof whereby water may pass from the float bowl through the chamber and into the lower central portion of the cover bowl.

CARROLL H. NELSON.

References Cited in the file of this patent

UNITED STATES PATENTS

| Number | Name | Date |
| --- | --- | --- |
| 1,253,941 | Copeland | Jan. 15, 1918 |
| 2,452,305 | Johnson | Oct. 26, 1948 |
| 2,479,355 | Hemker | Aug. 16, 1949 |
| 2,567,177 | Beckley | Sept. 11, 1951 |
| 2,590,266 | Nelson | Mar. 25, 1952 |

FOREIGN PATENTS

| Number | Country | Date |
| --- | --- | --- |
| 80,637 | Germany | Apr. 13, 1895 |